(12) United States Patent
Hahin et al.

(10) Patent No.: US 8,229,301 B2
(45) Date of Patent: Jul. 24, 2012

(54) CONFIGURATION OF OPTICAL TRANSCEIVERS TO PERFORM CUSTOM FEATURES

(75) Inventors: Jayne C. Hahin, Cupertino, CA (US); Luke M. Ekkizogloy, San Jose, CA (US); Gerald L. Dybsetter, Scotts Valley, CA (US)

(73) Assignee: Finisar Corporation, Sunnyvale, CA (US)

( * ) Notice: Subject to any disclaimer, the term of this patent is extended or adjusted under 35 U.S.C. 154(b) by 866 days.

(21) Appl. No.: 11/220,765

(22) Filed: Sep. 7, 2005

(65) Prior Publication Data

US 2006/0051049 A1   Mar. 9, 2006

Related U.S. Application Data

(60) Provisional application No. 60/607,743, filed on Sep. 7, 2004.

(51) Int. Cl.
*H04B 10/02* (2006.01)
*H04B 10/00* (2006.01)

(52) U.S. Cl. ......................... 398/135; 398/138

(58) Field of Classification Search ............... 398/140, 398/135–139; 717/168, 171, 172, 173
See application file for complete search history.

(56) References Cited

U.S. PATENT DOCUMENTS

| | | |
|---|---|---|
| 3,909,791 A | 9/1975 | Van Den Berg |
| 4,093,988 A | 6/1978 | Scott |
| 4,330,870 A | 5/1982 | Arends |
| 4,745,573 A | 5/1988 | Lebel |
| 4,947,411 A | 8/1990 | Shiraishi et al. |
| 5,003,591 A | 3/1991 | Kauffman et al. |
| 5,550,666 A | 8/1996 | Zirngibl |
| 5,778,218 A | 7/1998 | Gulick |
| 5,812,857 A | 9/1998 | Nelson et al. |
| 5,845,077 A * | 12/1998 | Fawcett ........................ 709/221 |
| 5,956,168 A | 9/1999 | Levinson et al. |
| 5,994,940 A | 11/1999 | Kawasaki |
| 6,081,888 A | 6/2000 | Bell et al. |
| 6,449,075 B1 | 9/2002 | Watson et al. |
| 6,735,731 B2 | 5/2004 | Ewen et al. |
| 6,862,322 B1 | 3/2005 | Ewen et al. |
| 7,080,245 B2 | 7/2006 | Ballard et al. |
| 7,146,412 B2 * | 12/2006 | Turnbull ....................... 709/220 |

(Continued)

FOREIGN PATENT DOCUMENTS

JP    59110227    6/1984

OTHER PUBLICATIONS

U.S. Appl. No. 11/220,769, Jul. 16, 2008, Office Action.

(Continued)

*Primary Examiner* — Kenneth N Vanderpuye
*Assistant Examiner* — Daniel Dobson
(74) *Attorney, Agent, or Firm* — Maschoff Gilmore & Israelsen (57) ABSTRACT

An optical transceiver (or optical transmitter or optical receiver) that includes a memory and a processor, which receives and executes custom microcode from a host computing system (hereinafter referred to simply as a "host"). A user identifies desired optical transceiver operational features, each of which may be implemented using specific microcode. The memory receives custom microcode that aggregates all the specific microcode of the identified operational features from the host. The processor may later execute the custom microcode and cause the transceiver to perform the operational features.

20 Claims, 3 Drawing Sheets

U.S. PATENT DOCUMENTS

| | | | |
|---|---|---|---|
| 7,215,891 B1 * | 5/2007 | Chiang et al. | 398/137 |
| 7,249,353 B2 * | 7/2007 | Zarco | 717/171 |
| 7,269,191 B2 * | 9/2007 | Stewart et al. | 372/34 |
| 7,313,681 B2 | 12/2007 | Chen et al. | |
| 7,317,733 B1 * | 1/2008 | Olsson et al. | 370/466 |
| 7,411,947 B2 * | 8/2008 | Mizuno et al. | 370/366 |
| 7,606,486 B2 | 10/2009 | Dybsetter et al. | |
| 2002/0027688 A1 | 3/2002 | Stephenson | |
| 2002/0112070 A1 | 8/2002 | Ellerbrock et al. | |
| 2002/0176131 A1 * | 11/2002 | Walters et al. | 359/118 |
| 2002/0176138 A1 | 11/2002 | Schlanger | |
| 2003/0002108 A1 | 1/2003 | Ames et al. | |
| 2003/0152390 A1 * | 8/2003 | Stewart et al. | 398/135 |
| 2003/0154282 A1 | 8/2003 | Horvitz | |
| 2004/0017794 A1 | 1/2004 | Trachewsky | |
| 2004/0022537 A1 | 2/2004 | Mecherle et al. | |
| 2004/0052528 A1 | 3/2004 | Halgren et al. | |
| 2004/0103347 A1 | 5/2004 | Sneed et al. | |
| 2004/0136422 A1 | 7/2004 | Mahowald et al. | |
| 2004/0136720 A1 * | 7/2004 | Mahowald et al. | 398/135 |
| 2004/0151073 A1 * | 8/2004 | Preisach | 368/110 |
| 2004/0202476 A1 | 10/2004 | Woolf et al. | |
| 2004/0260798 A1 | 12/2004 | Addinton et al. | |
| 2005/0044335 A1 | 2/2005 | Bee et al. | |
| 2005/0132349 A1 * | 6/2005 | Roberts et al. | 717/168 |
| 2006/0051098 A1 | 3/2006 | Hahin et al. | |
| 2006/0092051 A1 | 5/2006 | Dybsetter et al. | |
| 2006/0093370 A1 | 5/2006 | Ekkizogloy et al. | |
| 2006/0093371 A1 | 5/2006 | Hahin et al. | |

OTHER PUBLICATIONS

U.S. Appl. No. 11/220,769, Mar. 19, 2008, Office Action.
U.S. Appl. No. 11/119,447, Jun. 23, 2006, Office Action.
U.S. Appl. No. 11/119,447, Nov. 29, 2006, Office Action.
U.S. Appl. No. 11/119,447, Jul. 6, 2007, Office Action.
U.S. Appl. No. 11/119,447, Apr. 8, 2008, Office Action.
U.S. Appl. No. 11/119,447, Dec. 5, 2008, Office Action.
U.S. Appl. No. 11/119,447, Jun. 8, 2009, Notice of Allowance.
U.S. Appl. No. 11/220,769, Jan. 22, 2009, Office Action.
U.S. Appl. No. 11/220,769, Sep. 25, 2009, Office Action.
U.S. Appl. No. 11/220,769, Mar. 25, 2010, Office Action.
U.S. Appl. No. 11/220,769, Apr. 29, 2010, Notice of Allowance.
U.S. Appl. No. 11/256,290, Feb. 19, 2008, Office Action.
U.S. Appl. No. 11/256,290, Sep. 3, 2008, Office Action.
U.S. Appl. No. 11/256,290, Apr. 6, 2009, Office Action.
U.S. Appl. No. 11/256,290, Dec. 29, 2009, Office Action.
U.S. Appl. No. 11/256,290, Mar. 19, 2010, Notice of Allowance.
U.S. Appl. No. 11/256,329, Apr. 8, 2008, Office Action.
U.S. Appl. No. 11/256,329, Dec. 9, 2008, Office Action.
U.S. Appl. No. 11/256,329, Aug. 13, 2009, Office Action.
U.S. Appl. No. 11/256,498, Apr. 2, 2008, Office Action.
U.S. Appl. No. 11/256,498, Dec. 17, 2008, Office Action.
U.S. Appl. No. 11/256,498, Aug. 13, 2009, Office Action.
U.S. Appl. No. 11/256,498, Mar. 26, 2010, Office Action.
U.S. Appl. No. 11/256,329 Office Action mailed Aug. 27, 2010.
U.S. Appl. No. 11/256,329 Notice of Allowance mailed Jan. 26, 2011.
U.S. Appl. No. 11/256,498 Notice of Allowance mailed Feb. 28, 2011.
U.S. Appl. No. 11/256,329, Mar. 30, 2010, Final Office Action.
U.S. Appl. No. 11/256,290, May 14, 2010, Notice of Allowance.
U.S. Appl. No. 11/220,769, May 21, 2010, Notice of Allowance.

* cited by examiner

CONFIGURATION OF OPTICAL TRANSCEIVERS TO PERFORM CUSTOM FEATURES

CROSS-REFERENCE TO RELATED APPLICATIONS

This application claims the benefit of U.S. Provisional Application No. 60/607,743, filed Sep. 7, 2004, which is incorporated herein by reference in its entirety.

BACKGROUND OF THE INVENTION

1. The Field of the Invention

The present invention relates generally to optical transmitters, receivers, and transceivers. More specifically, the present invention relates to optical transmitters, receivers and transceivers that perform custom operations.

2. Background and Relevant Art

Computing and networking technology have transformed our world. As the amount of information communicated over networks has increased, high speed transmission has become ever more critical. Many high speed data transmission networks rely on optical transceivers and similar devices for facilitating transmission and reception of digital data embodied in the form of optical signals over optical fibers. Optical networks are thus found in a wide variety of high speed applications ranging from as modest as a small Local Area Network (LAN) to as grandiose as the backbone of the Internet.

Typically, data transmission in such networks is implemented by way of an optical transmitter (also referred to as an electro-optic transducer), such as a laser or Light Emitting Diode (LED). The electro-optic transducer emits light when current is passed through it, the intensity of the emitted light being a function of the current magnitude. Data reception is generally implemented by way of an optical receiver (also referred to as an optoelectronic transducer), an example of which is a photodiode. The optoelectronic transducer receives light and generates a current, the magnitude of the generated current being a function of the intensity of the received light.

Various other components are also employed by the optical transceiver to aid in the control of the optical transmit and receive components, as well as the processing of various data and other signals. For example, such optical transceivers typically include a-driver (e.g., referred to as a "laser driver" when used to drive a laser) configured to control the operation of the optical transmitter in response to various control inputs. The optical transceiver also generally includes an amplifier (e.g., often referred to as a "post-amplifier") configured to amplify the channel-attenuated received signal prior to further processing. A controller circuit (hereinafter referred to as the "controller") controls the operation of the laser driver and post-amplifier.

Controllers are typically implemented in hardware as state machines. Their operation is fast, but inflexible. Being primarily state machines, the functionality of the controller is limited to the hardware structure of the controller. Nevertheless, the features that may be desired by customers for these optical transceivers may be different, customer by customer. Accordingly, what would be advantageous are optical transmitters, receivers, and transceivers that have more flexible control to adjust to the various desired features for the optical transceiver.

BRIEF SUMMARY OF THE INVENTION

The foregoing problems with the prior state of the art are overcome by the principles of the present invention, which relate to an optical transceiver (or optical transmitter or optical receiver) that includes a memory and a processor, which receives and executes custom microcode from a host computing system (hereinafter referred to simply as a "host"). A user identifies desired optical transceiver operational features, each of which may be implemented using specific microcode. The memory receives custom microcode that aggregates all the specific microcode of the identified operational features from the host. The processor may later execute the custom microcode and cause the transceiver to perform the operational features.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and and therefore not to be considered limiting of its scope. The invention will be described and explained with additional specificity and detail through the use of the accompanying drawings in which.

DETAILED DESCRIPTION OF THE PREFERRED EMBODIMENTS

The principles of the present invention relate to an optical transceiver, including a memory and a processor, which receives and executes custom microcode from a host computing system (hereinafter referred to simply as a "host"). A user identifies desired optical transceiver operational features, each of which may be implemented using specific microcode. The memory receives custom microcode that aggregates all the specific microcode of the identified operational features from the host. The processor may later execute the custom microcode and cause the transceiver to perform the operational features. An example operational optical transceiver environment will first be described. Then, the operation in accordance with the invention will be described with respect to the operational environment.

Figure 1:
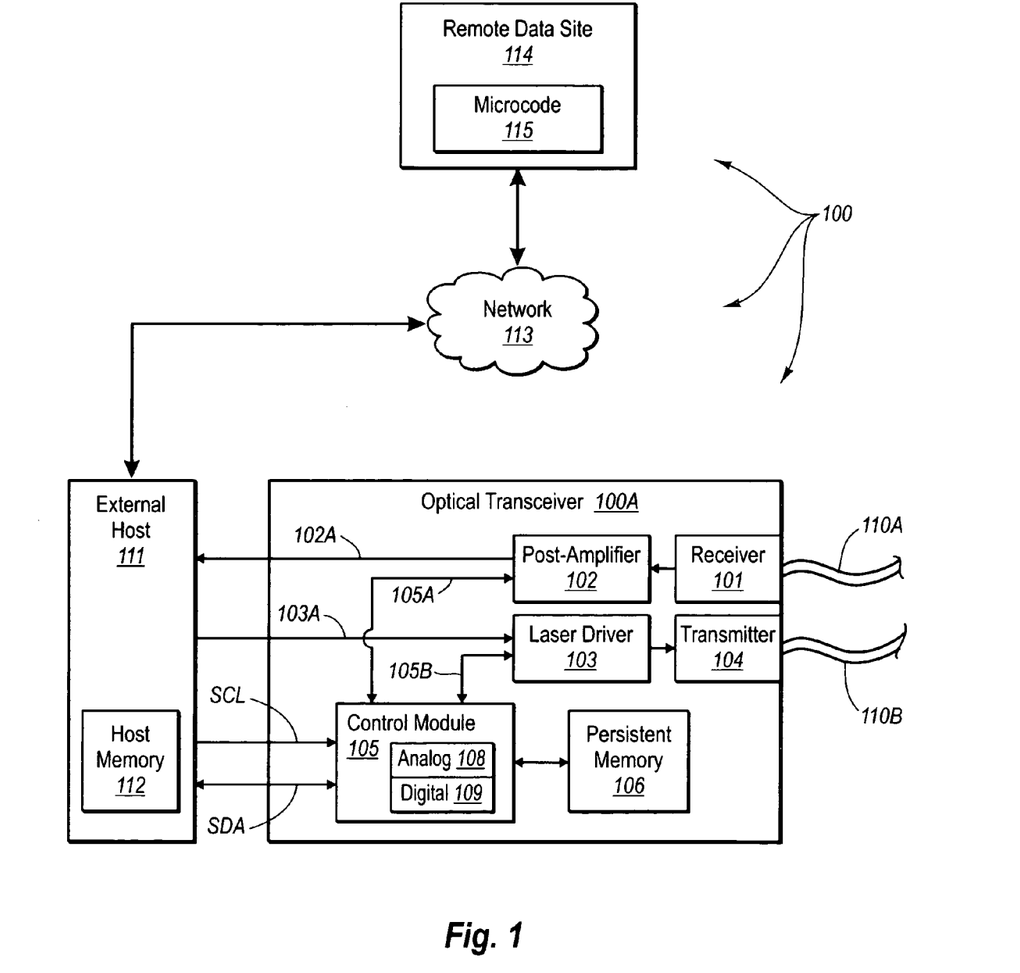
FIG. 1 schematically illustrates an example of an optical transceiver that may implement features of the present invention.

FIG. 1 illustrates an optical transceiver 100A in which the principles of the present invention may be employed. While the optical transceiver 100A will be described in some detail, the optical transceiver 100A is described by way of illustration only, and not by way of restricting the scope of the invention. The principles of the present invention are suitable for 1 G, 2 G, 4 G, 8 G, 10 G and higher bandwidth fiber optic links. Furthermore, the principles of the present invention may be implemented in optical (e.g., laser) transmitter/receivers of any form factor such as XFP, SFP and SFF, without restriction. Having said this, the principles of the present invention are not limited to an optical transceiver environment at all.

The optical transceiver 100A receives an optical signal from fiber 110A using receiver 101. The receiver 101 acts as an opto-electric transducer by transforming the optical signal into an electrical signal. The receiver 101 provides the resulting electrical signal to a post-amplifier 102. The post-amplifier 102 amplifies the signal and provides the amplified signal to an external host 111 as represented by arrow 102A. The external host 111 may be any computing system capable of communicating with the optical transceiver 100A. The external host 111 may contain a host memory 112 that may be a volatile or non-volatile memory source. In one embodiment, the optical transceiver 100A may be a printed circuit board or other components/chips within the host 111, although this is not required.

The optical transceiver 100A may also receive electrical signals from the host 111 for transmission onto the fiber 110B. Specifically, the laser driver 103 receives the electrical signal as represented by the arrow 1 03A, and drives the transmitter 104 (e.g., a laser or Light Emitting Diode (LED)) with signals that cause the transmitter 104 to emit onto the fiber 110B optical signals representative of the information in the electrical signal provided by the host 111. Accordingly, the transmitter 104 serves as an electro-optic transducer.

The behavior of the receiver 101, the post-amplifier 102, the laser driver 103, and the transmitter 104 may vary dynamically due to a number of factors. For example, temperature changes, power fluctuations, and feedback conditions may each affect the performance of these components. Accordingly, the optical transceiver 100A includes a control module 105, which may evaluate temperature and voltage conditions and other operational circumstances, and receive information from the post-amplifier 102 (as represented by arrow 105A) and from the laser driver 103 (as represented by arrow 105B). This allows the control module 105 to optimize the dynamically varying performance, and additionally detect when there is a loss of signal.

Specifically, the control module 105 may counteract these changes by adjusting settings on the post-amplifier 102 and/or the laser driver 103 as also represented by the arrows 105A and 105B. These settings adjustments are quite intermittent since they are only made when temperature or voltage or other low frequency changes so warrant. Receive power is an example of such a low frequency change.

The control module 105 may have access to a persistent memory 106, which in one embodiment, is an Electrically Erasable and Programmable Read Only Memory (EEPROM). The persistent memory 106 and the control module 105 may be packaged together in the same package or in different packages without restriction. Persistent memory 106 may also be any other non-volatile memory source.

Figure 2:
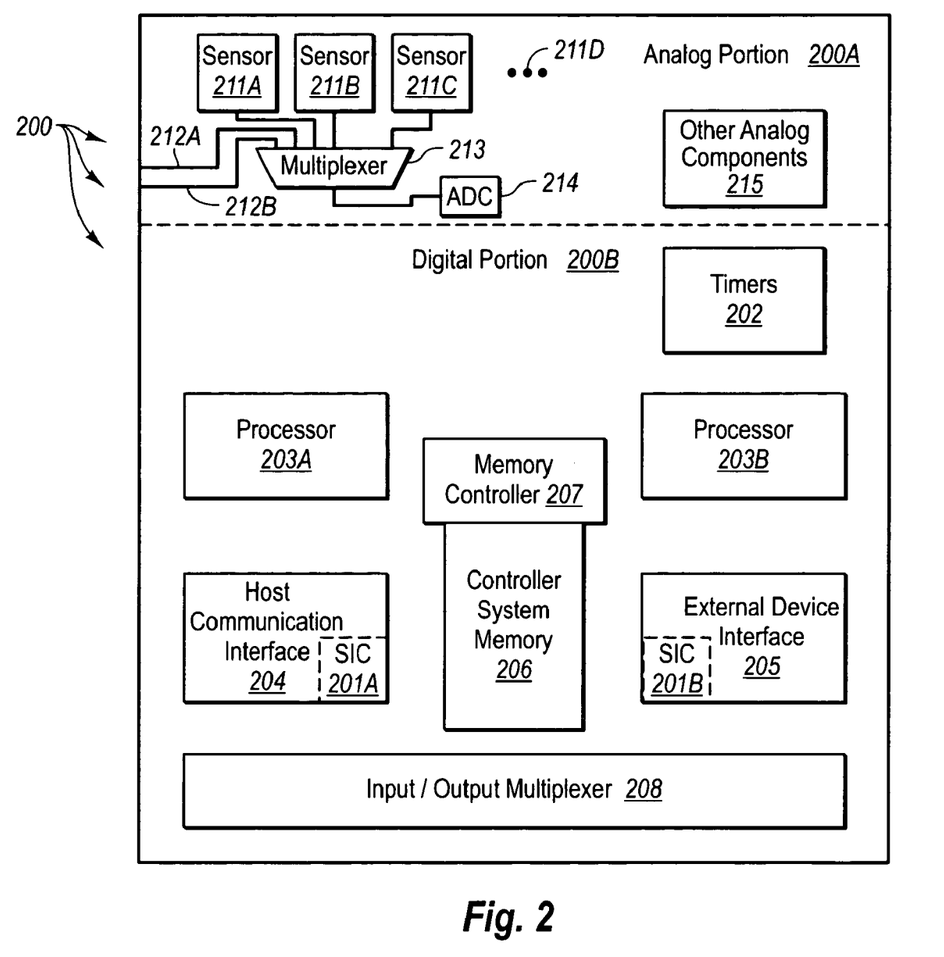
FIG. 2 schematically illustrates an example of a control module of FIG. 1.

The control module 105 includes both an analog portion 108 and a digital portion 109. Together, they allow the control module to implement logic digitally, while still largely interfacing with the rest of the optical transceiver 100A using analog signals. FIG. 2 schematically illustrates an example 200 of the control module 105 in further detail. The control module 200 includes an analog portion 200A that represents an example of the analog portion 108 of FIG. 1, and a digital portion 200B that represents an example of the digital portion 109 of FIG. 1.

For example, the analog portion 200A may contain digital to analog converters, analog to digital converters, high speed comparators (e.g., for event detection), voltage based reset generators, voltage regulators, voltage references, clock generator, and other analog components. For example, the analog portion 200A includes sensors 211A, 211B, 211C amongst potentially others as represented by the horizontal ellipses 211D. Each of these sensors may be responsible for measuring operational parameters that may be measured from the control module 200 such as, for example, supply voltage and transceiver temperature. The control module may also receive external analog or digital signals from other components within the optical transceiver that indicate other measured parameters such as, for example, laser bias current, transmit power, receive power, laser wavelength, laser temperature, and Thermo Electric Cooler (TEC) current. Two external lines 212A and 212B are illustrated for receiving such external analog signals although there may be many of such lines.

The internal sensors may generate analog signals that represent the measured values. In addition, the externally provided signals may also be analog signals. In this case, the analog signals are converted to digital signals so as to be available to the digital portion 200B of the control module 200 for further processing. Of course, each analog parameter value may have its own Analog to Digital Converter (ADC). However, to preserve chip space, each signal may be periodically sampled in a round robin fashion using a single ADC such as the illustrated ADC 214. In this case, each analog value may be provided to a multiplexer 213, which selects in a round robin fashion, one of the analog signals at a time for sampling by the ADC 214. Alternatively, multiplexer 213 may be programmed to allow any order of analog signals to be sampled by ADC 214.

As previously mentioned, the analog portion 200A of the control module 200 may also include other analog components 215 such as, for example, digital to analog converters, other analog to digital converters, high speed comparators (e.g., for event detection), voltage based reset generators, voltage regulators, voltage references, clock generator, and other analog components.

The digital portion 200B of the control module 200 may include a timer module 202 that provides various timing signals used by the digital portion 200B. Such timing signals may include, for example, programmable processor clock signals. The timer module 202 may also act as a watchdog timer.

Two general-purpose processors 203A and 203B are also included. The processors recognize instructions that follow a particular instruction set, and may perform normal general-purpose operation such as shifting, branching, adding, subtracting, multiplying, dividing, Boolean operations, comparison operations, and the like. In one embodiment, the general-purpose processors 203A and 203B are each a 16-bit processor and may be identically structured. The precise structure of the instruction set is not important to the principles of the present invention as the instruction set may be optimized around a particular hardware environment, and as the precise hardware environment is not important to the principles of the present invention.

A host communications interface 204 is used to communicate with the host 111, possibly implemented using a two-wire interface such as I²C shown in FIG. 1 as the serial data (SDA) and serial clock (SCL) lines on the optical transceiver 100A. Other host communication interfaces may also be implemented as well. Data may be provided from the control module 105 to the host 111 using this host communications interface to allow for digital diagnostics and readings of temperature levels, transmit/receiver power levels, and the like. The external device interface 205 is used to communicate with, for example, other modules within the optical transceiver 100A such as, for example, the post-amplifier 102, the laser driver 103, or the persistent memory 106.

The internal controller system memory 206 (not to be confused with the external persistent memory 106) may be Random Access Memory (RAM) or non-volatile memory. The memory controller 207 shares access to the controller system memory 206 amongst each of the processors 203A and 203B and with the host communication interface 204 and the external device interface 205. In one embodiment, the host communication interface 204 includes a serial interface controller 201A, and the external device interface 205 includes a serial interface controller 201B. The two serial interface controllers 201A and 201B may communicate using a two-wire interface such as $I^2C$ or another interface so long as the interface is recognized by both communicating modules. One serial interface controller (e.g., serial interface controller 201B) is a master component, while the other serial interface controller (e.g., serial interface controller 201A) is a slave component.

An input/output multiplexer 208 multiplexes the various input/output pins of the control module 200 to the various components within the control module 200. This enables different components to dynamically assign pins in accordance with the then-existing operational circumstances of the control module 200. Accordingly, there may be more input/output nodes within the control module 200 than there are pins available on the control module 200, thereby reducing the footprint of the control module 200.

Having described a specific environment with respect to FIGS. 1 and 2, it will be understood that this specific environment is only one of countless architectures in which the principles of the present invention may be employed. As previously stated, the principles of the present invention are not intended to be limited to any particular environment. Accordingly, the principles of the present invention relate to an optical transceiver capable of implementing custom operational features as identified by a user. The custom features are implemented by the choice of specific microcode relating to each custom feature. The principles of the present invention will be discussed with reference to the environment described in relation to FIGS. 1 and 2.

In many cases, transceiver 100A may be preloaded with microcode that implements operational features determined by the transceiver manufacturer. However, a user may desire to add additional operational features to meet specific needs or circumstances for a given transceiver 100A. The principles of the present invention allow for a user to identify additional operational features and for microcode implementing these additional operational features (herein after also referred to as the microcode) to be received by persistent memory 106 and controller system memory 206 and later to be executed by processors 203. The principles of the present invention also operate to allow a user to identify operational features that may be performed by the transceiver even when initializing the transceiver 100A with microcode.

Figure 3:
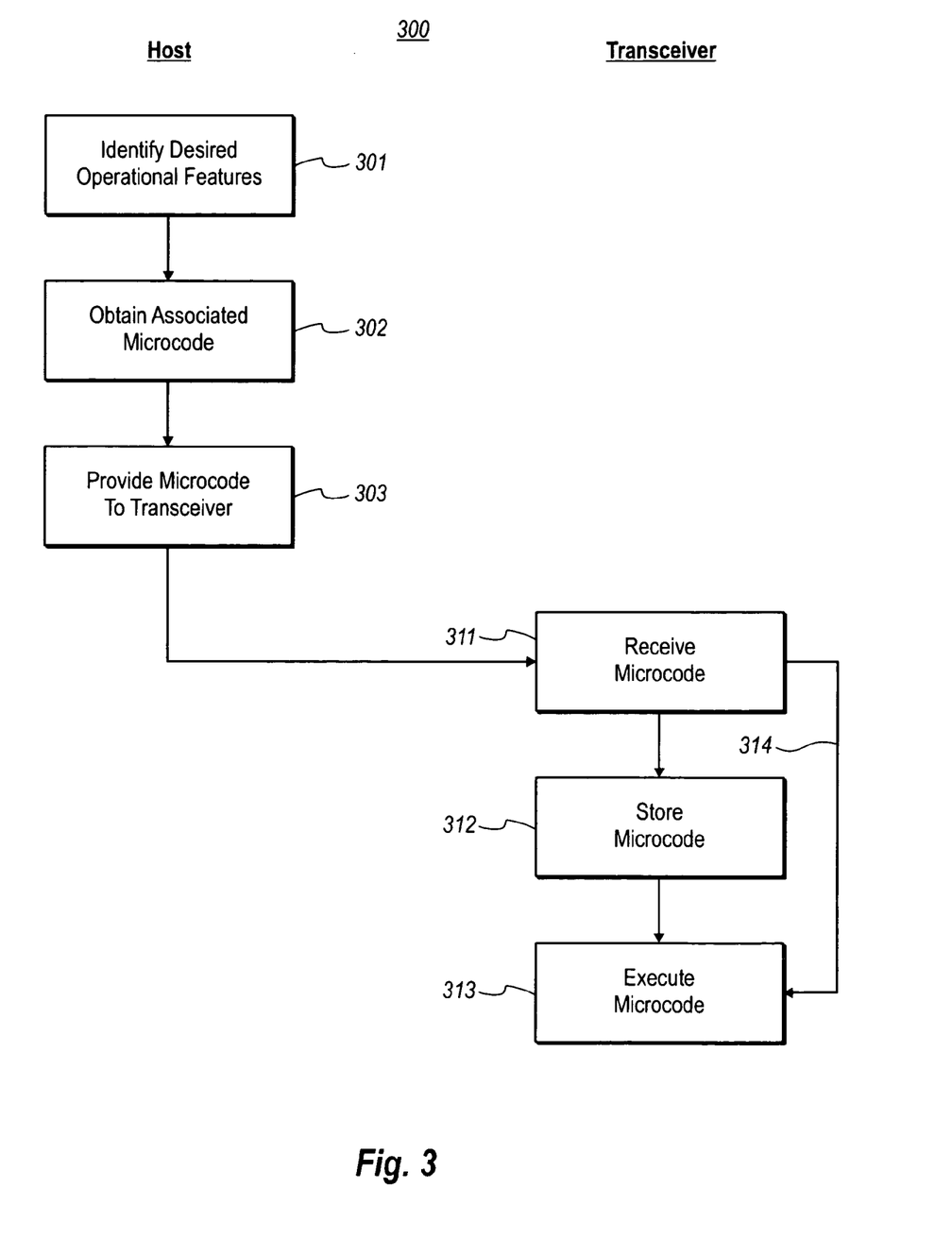
FIG. 3 illustrates a flowchart of a method for an optical transceiver to receive and execute custom microcode from a host computing system in accordance with the principles of the present invention.

FIG. 3 illustrates a flowchart of a method 300 for an optical transceiver (e.g., optical transceiver 100A of FIG. 1) to receive and execute custom microcode from a host computing system (e.g., external host 111 of FIG. 1) in accordance with the principles of the present invention. The method 300 includes acts performed by both the host computing system and the optical transceiver itself. Acts that are performed by the host computing system are presented in the left column of FIG. 3 under the heading "Host". Acts that are performed by the optical transceiver are presented in the right column of FIG. 3 under the heading "Transceiver". Acts that are performed by the host may be performed using a computer-program product that comprises one or more computer-readable media (e.g., physical memory media) having thereon computer-executable instructions that, when executed by one or more processors of the host computing system, causes the host computing system to perform the acts.

The method includes an act of the host identifying desired transceiver operational features (act 301), wherein each feature is implemented using specific microcode. The desired features may be identified by a user through a user interface perhaps associated with the host computing system.

There may be numerous additional operational features available to a user. In this description and in the claims, an "operational feature" is defined as a specific transceiver operational function that is enabled by executing microcode. The following are examples of operational features. These examples are not exhaustive and should not be read to limit the claims.

One example is an alarm or warning setting. This would allow a user to specify that an alarm be triggered when an operational parameter such as temperature reaches a certain value. Another example is a diagnostic possibly in addition to any standard diagnostics. For example, a user may be more interested in the operation of the laser driver 103. The diagnostic could run specific checks on the laser driver 103 and report the results back to the host 111. A third example of an operational feature would allow the user to set various operational parameters such as voltage minimum and maximum, operating time, up time, and temperature at desired levels. A fourth example would allow for off transceiver module logging of transceiver operational data. A final example would allow the user to choose how to implement serial interface controllers 201. For example, the user could specify that either the FSB bus or an $I^2C$ interface be used when communicating between the host and optical transceiver. Additional operational features may also be implemented.

The host computing system then obtains microcode that implements the desired identified operational features (act 302). In one embodiment, transceiver 100A is part of an environment 100 including a host 111, a network 113, and a remote computing site 114 as shown in FIG. 1. Host 111, in addition to the functionality discussed previously, may be any computing system capable of connection to the Internet or some other network 113. This connection may be achieved by any standard internet or wide area network protocol. Host 111 may be able to access over the wide area network 113 the remote data site 114. The remote data 114 site may be a computing system or similar device. The remote data site 114 may be configured to allow a user to identify and select various desired operational features through use of an interface such as a World Wide Web site. For example, the World Wide Web site may present a page that has radio buttons that correspond to additional transceiver 100A operational features. A user may identify a desired feature by selecting the radio button for that feature using a keyboard or a mouse connected to host 111. This process may be repeated as appropriate for as many additional features as desired.

The remote data site 114 may be further configured to contain a library of microcode 115 that corresponds to, and when executed implements, each of the individual operational features. The remote data site 114 may access the specific microcode corresponding to the operational feature identified by the selected radio button. The remote data site 114 may then send the specific microcode to host 111 for further use. In some instances, a user may identify more than one desired operational feature by selecting multiple radio buttons. The remote data site 114 may access the different implementing microcode in different ways.

For example, in one embodiment, the remote data site 114 may aggregate the microcode for each selected feature before sending the microcode to host 111. "Aggregation" is defined in the description and claims as the combination of the individual feature implementing sets of microcode into one microcode in a manner that ensures that each individual feature is implemented in transceiver 100A. The aggregation may be performed in any way known to those skilled in the art. The remote data site 114 may then send the aggregated microcode to host 111 for further use. For example, if a user selected the radio buttons corresponding to the alarm setting feature and the off module logging feature, then the microcode for these features would be aggregated into one microcode and sent to host 111. This process may be applied to any combination of user selected features as appropriate.

Host 111 may download the aggregated microcode from the remote data site 114 over the wide area network 113 as described. Host 111 may then provide the microcode to transceiver control module 105 (act 303) over the SDA and SCL lines or other implemented host communication interface, whereupon the transceiver receives the microcode (act 311). The microcode may be stored in persistent memory 106 (act 312) for later execution (act 313). Alternatively, the microcode may be directly loaded into controller system memory 206 for immediate execution as represented by arrow 314. The processors 203 execute the microcode (act 313), causing the transceiver 100A to perform the identified operational features.

In another embodiment, a user may use the host 111 to access the remote data site 114 and identify the desired additional operational features as previously discussed. However, in this case the appropriate microcode may be delivered to the user using a temporary storage unit such as a digital video disk (DVD) or a compact disk (CD) ROM. For example, a user may desire the alarm feature discussed above. The user would check the radio button corresponding to this feature and the appropriate microcode would be identified. The microcode could then be sent to the user on a DVD by the owner of the remote data site 114 and the user could load it into host memory 112 through use of a DVD or CD ROM drive. Host 111 would provide the microcode to control module 105 over the SDA and SCL lines and processors 203 would execute the microcode as discussed.

A specific example of the present invention will be described. Suppose a user desired to add the warning or alarm feature for any temperature over 80° C. In addition, the user desired an additional diagnostics feature for the laser driver 103. The user would access the remote data site 114 using host 111. Using the mouse or keyboard attached to host 111, the user would identify and select the radio button corresponding to the alarm feature and the radio button corresponding to the additional diagnostic. The remote data site 114 would then access the specific microcode that would cause transceiver 100A to create a temperature alarm and to perform the additional laser driver 103 diagnostic. The data site 114 would then aggregate the individual microcode and provide the resulting microcode to host 111.

Host 111 would then load the aggregated microcode into persistent memory 106. Processors 203 would load the microcode from persistent memory 106 into controller system memory 206 and execute the microcode. An alarm feature for temperatures over 80° C. would be implemented. As discussed previously, any of sensors 211 may be a temperature sensor. Sensors 211 send their temperature data to processors 203 through multiplexer 213 and analog to digital converter 214. If the temperature received by processors 203 was above 80° C., then the aggregated microcode would cause processors 203 to create an alarm or warning signal to alert the user. This signal could be sent to host 111, allowing the user to evaluate the alarm and form a response.

In like manner, the transceiver 100A would also implement the additional diagnostic for laser driver 103 in response to the aggregated microcode. A digital signal would be sent to a digital to analog converter in other analog components 215. The converted signal would be sent to laser driver 103 over line 105B. This signal would cause laser driver 103 to perform an internal diagnostic. The diagnostic data would then be sent back to control module 105 over line 105B. The signal would be sent to multiplexer 213 over external lines 212 and converted to digital by analog to digital converter 214. The diagnostic results would then be sent to host 111 over the SDA line for user analysis. This process could be repeated as appropriate.

Although two specific operational features were described in detail, it should be noted that all other additional operational features may be implemented in a like manner. As well, the process of identifying, selecting, receiving, and executing microcode corresponding to an operational feature may be accomplished more than once. For example, in the above embodiment an alarm feature for temperature and a diagnostics feature for the laser driver 103 were implemented. However, a user could later desire to add more operational features to transceiver 100A. The user could access the remote data site 114 and begin the process again for the new features. In this way, transceiver 100A may continually have operational features added as circumstances and needs dictate.

The principles of the present invention provide for an optical transceiver with many benefits over current optical transceivers. Specifically, the present invention allows for easy selection and implementation of additional transceiver operational features. A user has the ability to select desired features from a remote source. Microcode that implements each selected feature can be downloaded to the optical transceiver and executed. This allows the user to control what functions the transceiver will perform. In addition, the user may repeat the process as necessary to add additional operational features when the user's needs dictate. Accordingly, the principles of the present invention represent a significant advancement in the art of optical transceivers.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed is:

1. In an optical transceiver that is communicatively coupled to a host computing system, the optical transceiver including a memory and at least one processor, a method for the optical transceiver to receive and execute custom microcode from the host computing system, the method comprising the following:

an act of receiving microcode at the host computing system from a remote data site via a network interface on the host computing system, the remote data site providing the microcode by aggregating specific microcode for a plurality of identified operational features, wherein the plurality of identified operational features are selected by a user at the host computing system; and an act of providing the received microcode from the host computing system to the memory of the optical transceiver via a two-wire interface on the host computing system, wherein the microcode is structured such that, when executed by the at least one processor, the optical transceiver is caused to perform the identified operational features, wherein at least one of the user-selectable operational features is a feature that configures an interface controller at the optical transceiver to cause the optical transceiver to communicate with the host computing system using a predetermined user-specified interface chosen from among multiple available interfaces.

2. A method in accordance with claim 1, wherein at least one of the plurality of identified operational features comprises an alarm or warning setting.

3. A method in accordance with claim 1, wherein at least one of the plurality of identified operational features comprises a diagnostics feature.

4. A method in accordance with claim 1, wherein at least one of the plurality of identified operational features comprises a feature that allows a user to set a plurality of operational parameters.

5. A method in accordance with claim 1, wherein at least one of the plurality of identified operational features comprises an off module logging feature that logs transceiver operational data.

6. A method in accordance with claim 1, further comprising:

an act of executing at least a portion of the received microcode using the at least one processor.

7. In a host computing system that is communicatively coupled to an optical transceiver, the optical transceiver including a memory and at least one processor, a method for the host computing system to provide microcode to the optical transceiver, the method comprising the following:

an act of receiving a user selection that identifies which of a plurality of operational features are desired to be implemented by the optical transceiver;

an act of obtaining at the host computing system via a network interface on the host computing system associated microcode structured such that, when executed by at least one processor of the optical transceiver, the optical transceiver is caused to implement the user-selected plurality of operational features; and an act of providing the obtained microcode to the optical transceiver using a non-network interface on the host computing system, wherein at least one of the user-selectable operational features is a feature that configures an interface controller at the optical transceiver to cause the optical transceiver to communicate with the host computing system using a predetermined user-specified interface chosen from among multiple available interfaces.

8. A method in accordance with claim 7, wherein another at least one of the user-selectable operational features comprises an alarm or warning setting.

9. A method in accordance with claim 7, wherein another at least one of the user-selectable operational features comprises a diagnostics feature.

10. A method in accordance with claim 7, wherein another at least one of the user-selectable operational features comprises a feature that allows a user to set a plurality of operational parameters.

11. A method in accordance with claim 7, wherein another at least one of the user-selectable operational features comprises an off module logging feature that logs transceiver operational data.

12. A method in accordance with claim 7, wherein the act of receiving the user selection that identifies which of a plurality of operational features are desired to be implemented by the optical transceiver is performed using a graphical interface displayed at the host computing system, the graphical interface including user-selectable buttons enabling a user to select which of the plurality of operational features are desired to be implemented by the optical transceiver.

13. A method in accordance with claim 7, wherein the act of obtaining associated microcode comprises:

an act of obtaining the associated microcode over a network.

14. A computer program product for use in a host computing system that is communicatively coupled to an optical transceiver, the optical transceiver including a memory and at least one processor, the computer program product comprising one or more non-transitory computer-readable media having thereon computer-executable instructions for implementing a method for the host computing system to provide microcode to the optical transceiver, the method comprising the following:

an act of receiving a user selection that identifies which of a plurality of operational features is desired to be implemented by the optical transceiver;

an act of obtaining at the host computing system via a network interface on the host computing system associated microcode such that, when executed by at least one processor of the optical transceiver, the optical transceiver is caused to implement the plurality of operational features; and an act of providing the obtained microcode to the optical transceiver using a non-network interface on the host computing system, wherein at least one of the user-selectable operational features is a feature that configures an interface controller at the optical transceiver cause the optical transceiver to communicate with the host computing system using a predetermined user-specified interface chosen from among multiple available interfaces.

15. A computer program product in accordance with claim 14, wherein the plurality of user-selectable operational features further comprises at least one of the following:

an alarm or warning setting;

a diagnostics feature;

a feature that allows a user to set a plurality of operational parameters; and an off module logging feature.

16. A computer program product in accordance with claim 14, wherein the act of receiving the user selection that identifies which of a plurality of operational features are desired to be implemented by the optical transceiver is performed using a graphical interface displayed at the host computing system, the graphical interface including user-selectable buttons enabling a user to select which of the plurality of operational features are desired to be implemented by the optical transceiver.

17. A computer program product in accordance with claim 14, wherein the act of obtaining associated microcode comprises:

an act of obtaining the associated microcode over a network.

18. A computer program product in accordance with claim 14, wherein the one or more computer-readable media are physical memory media.

19. A method in accordance with claim 1, wherein the feature that configures the interface controller allows a user to specify that either an FSB bus or an I2C interface be used by the optical transceiver to communicate with the host computing system.

20. A method in accordance with claim 7, wherein the feature that configures the interface controller allows a user to specify that either an FSB bus or an I2C interface be used by the optical transceiver to communicate with the host computing system.

\* \* \* \* \*